Nov. 20, 1951     O. A. KERSHNER     2,575,963
HYDRAULIC DISK BRAKE AND ACTUATOR MEANS THEREFOR
Filed Aug. 11, 1949     3 Sheets-Sheet 1

Nov. 20, 1951     O. A. KERSHNER     2,575,963
HYDRAULIC DISK BRAKE AND ACTUATOR MEANS THEREFOR
Filed Aug. 11, 1949     3 Sheets-Sheet 3

INVENTOR.
O. A. Kershner
BY
Robb & Robb
Attorneys.

Patented Nov. 20, 1951

2,575,963

UNITED STATES PATENT OFFICE 2,575,963

HYDRAULIC DISK BRAKE AND ACTUATOR MEANS THEREFOR

Osborn A. Kershner, St. Joseph, Mich., assignor, by mesne assignments, to Lambert Brake Corporation, St. Joseph, Mich., a corporation of Michigan Application August 11, 1949, Serial No. 109,651

18 Claims. (Cl. 188—152)

The present invention relates to fluid-operated or hydraulic brakes, and more especially, to double-disc hydraulic brakes of the type disclosed in the copending application of Lambert and Myers, Serial No. 66,404, filed December 21, 1948.

As is now well-known, such brakes have many advantages over brakes of the conventional drum type, particularly from the standpoint of the more powerful and effective braking action, longer wear, cooler braking operation of disc brakes, and consequent elimination of drum expansion and "gasing-out" troubles, etc., to which drum brakes are so susceptible. These problems have become of exceedingly grave importance in the case of automotive vehicles, with the advent of higher speeds, fluid drives and similar transmissions, which place more load and work on the brakes than formerly. Accordingly, more powerful and effective braking actions are essential for use for automobiles, buses, trucks, and similar vehicles, and it is also very important that the braking action be equally effective in both forward and rearward motion of the vehicle. This has given rise to the development of brakes employing floating or semi-floating braking elements, with consequent creation of new problems, particularly in the case of brakes of the servo-type, whether they be drum brakes or disc brakes.

Outstanding among these problems is that of noises in the brake which are especially noticeable and objectionable in the case of automobile brakes, and which are more likely to occur and be very pronounced when the brakes are applied during reverse motion of the vehicle. In the case of disc brakes of the type disclosed in the copending application hereinbefore referred to, one of the two double discs must engage a stop, such as a stud or the end of the hydraulic power cylinder, to hold it relatively stationary, while the other disc is rotated slightly relative to the first-mentioned disc to produce axial separation of the discs pursuant to the camming action of the balls, in order to energize the brake and create a braking action on the casing or housing which rotates with the wheel or other rotatable member to be braked. If the rotation of the member to be braked were reversed, the second-mentioned disc would shift rotatably into engagement with the stop and become relatively stationary, and the first-mentioned disc would rotate relative to the other disc to axially separate the discs and energize the brake. The noises attending the metal-to-metal or other engagement of the discs with the stops as aforesaid, while having no bearing upon the effectiveness of the brake, are nevertheless objectionable from a practical standpoint in the case of automobiles. Moreover, any bearing contact between the discs and the stops produces frictional resistance to free axial movement of the discs during braking energization, with consequent loss of effective braking force.

With the foregoing problems and difficulties in view, it is one of the primary objects of the present invention to provide a brake construction which is equally effective in its braking operation in either direction of rotation of the wheel or other member to be braked, and which is completely noiseless and silent at all times, and particularly during application of the brake during or following change of direction of rotation of the member to be braked, or change of the direction of travel of the vehicle.

Is is also another primary object of the present invention to provide an automatic and completely noiseless and silent stop which effectively opposes and takes the torque tending to shift the braking elements rotatively with the member to be braked as the initial braking action occurs, and which positively holds one of the braking elements or discs against rotation, while the other braking element or disc is completely free for movements rotatively relative to the relatively stationary disc, and also leaving both braking elements or discs completely free to move towards and away from each other without any frictional resistance or loss of braking power.

It is a further object of this invention to provide a torque-opposing stop of the character aforesaid which is preferably of the hydraulic type and wherein the torque is imposed upon the hydraulic braking fluid of the brake system, and preferably in the power or wheel cylinder.

A further object of the invention is to provide a hydraulic torque-opposing stop which is equally effective in either direction of rotation of the member to be braked, and hence in both forward and rearward directions of travel in the case of automobile or vehicle brakes.

Another object of the invention is to provide an improved hydraulic power or wheel cylinder of the double-acting, dual piston type, said cylinder having valve means freely admitting the hydraulic pressure fluid into the cylinder so as to actuate both pistons for imparting thrusts to both brake members or discs of the double-disc brake, but said valve means being so constructed and arranged as to prevent escape of the hydraulic fluid from the cylinder, and thus automatically trap the fluid in the cylinder responsive to the torque imparted to the discs in either direction, tending to rotate the double-disc assembly as the discs initially engage the usual opposing braking surfaces on the casing or housing which rotates with the member to be braked, thereby effectively preventing rotation or "clocking" of the discs, yet permitting limited rotation of one disc relative to the other.

A still further object of the invention is to provide an improved double-acting power or wheel cylinder as aforementioned, wherein the axes of the respective pistons and the piston travel are inclined relative to each other so as to impart the thrust of the pistons upon the brake members or discs in a line which is more-or-less tangential to each disc, with consequent greater force acting to cause rotation of the discs relative to each other in opposite directions.

The invention further contemplates the utilization of diametrically oppositely arranged wheel cylinders of the type above referred to, wherein thrust pins or plungers having rounded ends are interposed between the pistons and the discs and seated in correspondingly rounded seats provided in the pistons and discs, respectively, said cylinders being fixed to a stationary support, with the discs wholly supported by the thrust pins or plungers aforesaid and freely floating without the aid of any piloting means so as to be capable of completely frictionless rotatable and axial movements relative to each other during braking action.

Other and further objects and advantages of the invention will be hereinafter described and the novel features thereof defined in the appended claims.

Figure 2:
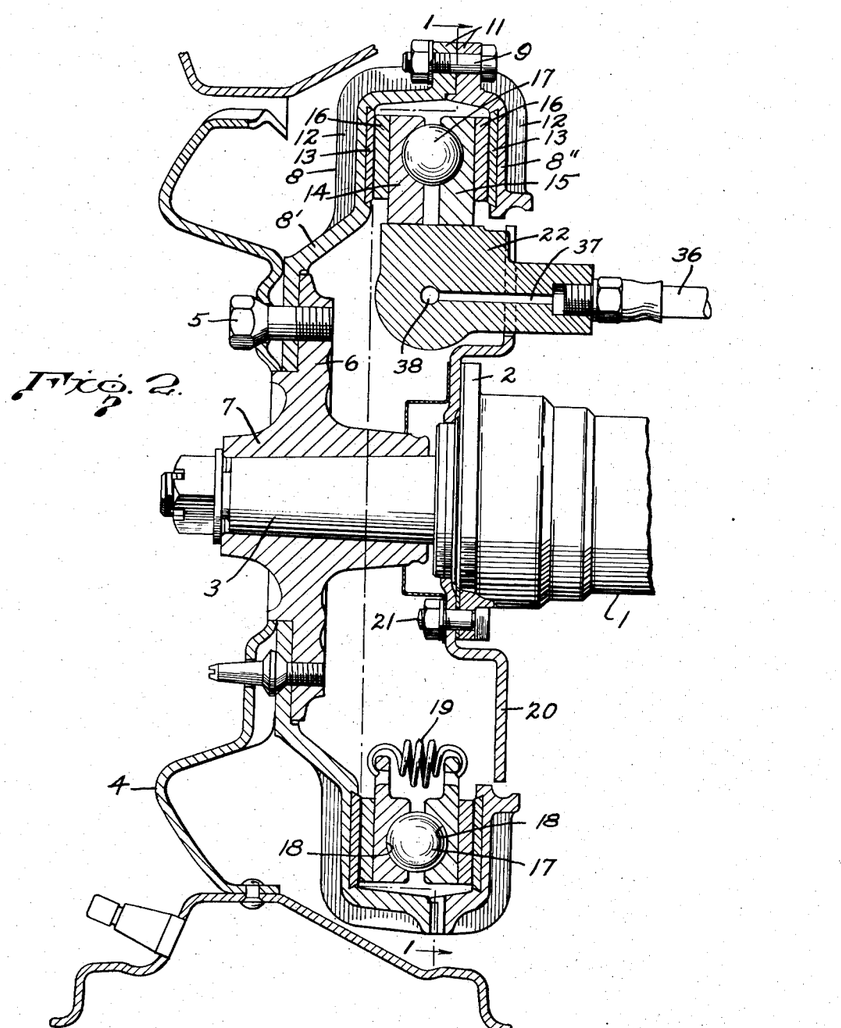
Figure 2 is a sectional view through the brake as taken on the line 2—2 of Figure 1, together with the wheel which is associated with the brake, certain parts of this view being shown in elevation.
Figure 3:
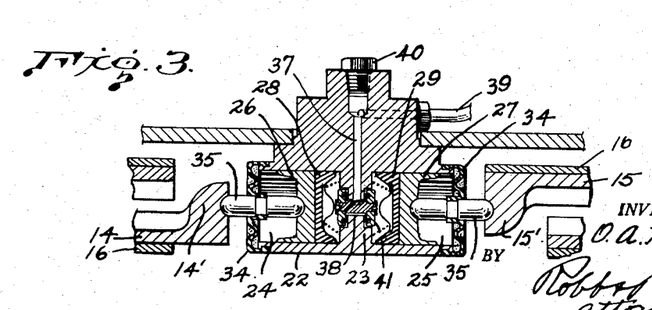
Figure 3 is a fragmentary sectional view taken on the line 3—3 of Figure 1 through one of the double-acting power cylinders and the associated braking elements, with the brake housing omitted.

Like reference characters designate corresponding parts in the several figures of the drawings, wherein 1 denotes a conventional rear axle housing of an automotive vehicle, said housing being provided with an annular flange 2, and the housing having the usual rear axle or driving axle 3 extended therefrom, as best shown in Figure 2 of the drawings. The wheel 4 which is to be driven by the axle 3 is attached by bolts 5 to the radially extended flange 6 of a hub 7 which is mounted on the axle 3 in the usual manner, for rotation therewith. This construction is all conventional in certain makes of automotive vehicles, but it is to be understood that the present invention is not limited to such constructions, but may be readily adapted to any automotive vehicle or other element to be braked. Accordingly, the description and drawings of this application are to be taken as illustrative of one specific embodiment of the present invention.

Also attached to the flange 6 of the hub 7 is a casing or housing, generally indicated at 8, constituting the rotary member to be braked, said casing or housing being rotatable with the wheel 4. The casing or housing is preferably made in two parts, one of which is designated 8', and the other of which is designated 8", the part 8' being secured to the flange 6 by the bolts 5, and the part 8" being secured to the part 8' by a plurality of bolts or screws 9 extended through peripherally spaced openings 10 in the abutting marginal flanges 11 formed at the meeting faces of the housing sections 8', 8", respectively. The outer faces of the housing sections 8', 8" are each preferably provided with cooling fins or ribs 12 in the usual manner, to aid in dissipating the heat generated in the brake during braking action.

Within the brake housing or casing 8, the respective housing sections 8', 8" are provided with annular braking surfaces which are arranged in opposed spaced relation to each other, and which preferably carry suitable friction members of annular form as indicated at 13, 13.

Disposed within the housing or casing 8 is a double-disc assembly or unit composed of two disc members respectively designated 14 and 15, the disc 14 being the outboard disc, and the disc 15 being the inboard disc. These discs are identical with each other and have the form of annular rings to the outer faces of which are attached friction lining segments as indicated at 16.

Between the discs 14, 15 is disposed a plurality of balls 17 which are seated in oppositely tapered seats 18 formed respectively in the opposed inner faces of the discs 14, 15. The balls serve as energizing means for the discs and act to spread the discs apart responsive to slight rotation of the discs relative to each other and pursuant to the camming action of the balls 17 and their seats 18. When this camming action occurs, and the discs are spread apart, the linings 16, 16 on the respective discs engage the friction surfaces 13, 13 on the casing or housing 8 and thus exert a powerful braking action upon the rotary housing 8, with consequent braking of the wheel 4.

Figure 1:
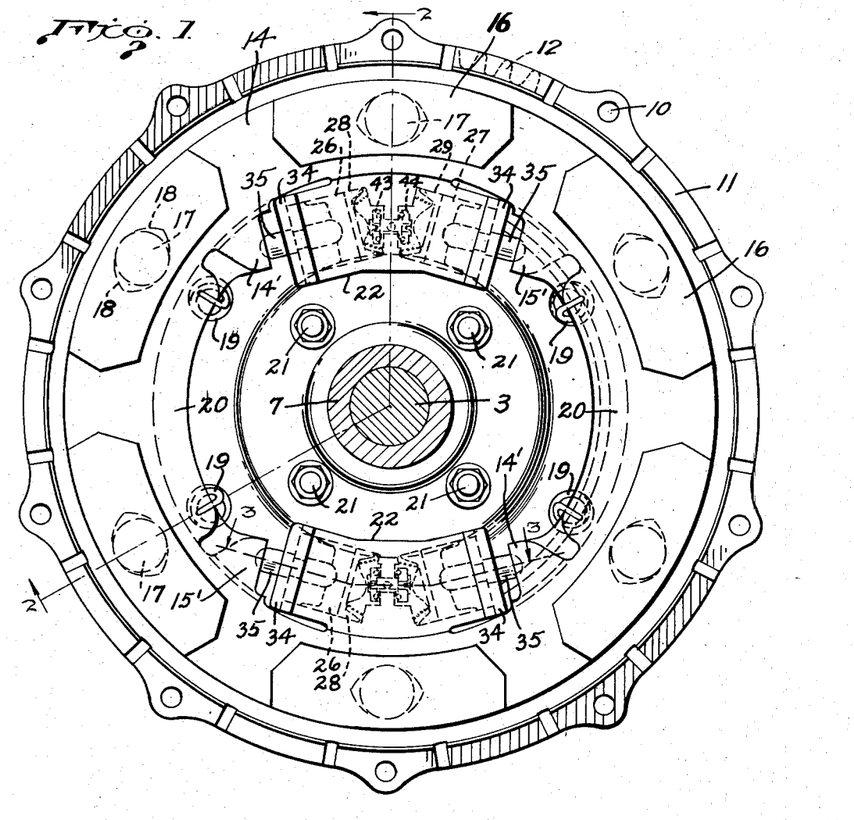
Figure 1 is a view of a double-disc brake constructed in accordance with the present invention and as more particularly applicable to automotive vehicles, said brake embodying opposed sets of double-acting power cylinders or wheel cylinders, one side of the rotatable brake housing or casing being removed so as to expose the interior of the brake assembly which is shown in elevation, with the exception of the driving shaft and wheel mounting hub thereon, both of which are shown in section as taken on the line 1—1 of Figure 2.

A plurality of tension springs 19 are connected between the two discs 14, 15 to normally yieldingly urge the two discs towards each other, with the balls 17 firmly held therebetween. The balls are thus normally urged by the springs 19 towards the deepest part of the respective ball seats 18, 18 so as to normally disengage the discs 14, 15 from contact with the rotary housing 8, with appropriate running clearance between the friction faces of the respective discs and the housing. As shown in Figures 1 and 2, the opposite ends of the springs 19 are connected respectively to inwardly extended flanges or webs formed on the inner periphery of the respective discs 14, 15.

The principle of the braking action of this brake construction is the same as is disclosed in the prior application above referred to, and it will be further understood that the double-disc and ball assembly just described constitutes a composite unit or assembly which is mounted within the rotary brake housing 8 in concentric relation thereto and to the axis of the wheel 4 or other rotary member to be braked. This double-disc unit or assembly is supported and actuated by fluid pressure actuator means which will now be more particularly described.

Attached to the flange 2 of the axle housing I is a stationary backing plate 20, said backing plate being connected to the flange 2 in any suitable manner, as by means of a plurality of bolts 21, with the backing plate extending across and substantially closing the inner side of the rotary brake housing 8, as more particularly seen in Figure 2.

Mounted upon the backing plate 20 and secured thereto in any suitable manner in diametrically disposed relation to each other are two actuators respectively designated 22, 22, these actuators being identical with each other and preferably being of the fluid-operated or hydraulic type. In common parlance in this art, these actuators are known as power cylinders or wheel cylinders, and according to the present invention, each cylinder or actuator is of the double-acting, dual-piston type. As indicated previously, both cylinders are rigidly mounted on the stationary backing plate 20, and remain stationary at all times. Each cylinder is preferably provided with a transversely extended partition 23 located about midway between the opposite ends thereof, and dividing the cylinder into two separate piston chambers respectively designated 24 and 25. A piston 26 is mounted in the chamber 24 and a piston 27 is mounted in the chamber 25, the pistons being arranged in opposed relation to each other at the respective opposite sides of the transverse partition 23, and each piston being shiftable in opposite directions in its piston chamber. Resilient sealing cups 28 and 29 are mounted between each piston and the transverse partition 23, the sealing cups being yieldingly urged into contact with the respective pistons by light coil springs 30, 31 respectively seated at one end against the partition 23, and at their other ends against thin metal expanders 32, 33 which bear against the inner faces of the resilient sealing cups 28, 29, respectively.

Disposed over each end of each of the wheel cylinders 22, 22 is a rubber or other flexible dust cap 34, each dust cap snugly gripping a thrust pin 35 or plunger which extends centrally through the same, with one end of the pin seating against the adjacent piston in the corresponding end of the cylinder, and the opposite end of the pin seating against a lug or boss formed on the respective discs 14, 15. Each of the discs 14, 15 is provided with two diametrically disposed lugs or bosses, those for the disc 14 being designated 14', and those for the disc 15 being designated 15', and the thrust pins 35 extending from the end of one wheel cylinder and from the opposite end of the other wheel cylinder engage the bosses 14', while the other thrust pins extending from the other end of the first cylinder and from the opposite end of the second cylinder, respectively, engage the other bosses 15'. Both ends of each thrust pin 35 are preferably rounded and seat in correspondingly rounded seats in the pistons and disc bosses. Thus, the pins all have free universal movement between the pistons and discs so as to accommodate relative rotative movements of the discs, as well as relative axial movements of the discs.

As will be observed from reference to Figure 1 of the drawings, the axis of one piston of each of the wheel cylinders 22, and the axis of the movement of the piston in the cylinder, is inclined relative to the axis of the other piston and its travel in the same cylinder, these respective axes being inclined inwardly towards the center of the brake assembly. This has the effect of exerting the thrust produced by the respective pistons, through the thrust pins or plungers 35, upon the respective discs 14, 15 in a more-or-less tangential direction to the discs, with consequent greater force than if the pistons were aligned in the wheel cylinders on the same axis. In order to accommodate the inclined arrangement of the pistons in each of the wheel cylinders, the cylinders are more-or-less arcuate in form and act to centrally locate the double-disc assembly concentrically with respect to the central axis of the brake, but the disc assembly does not actually pilot upon the wheel cylinders. Instead, the disc assembly is wholly supported and floats upon the thrust pins 35, at least during all braking applications, when thrusts are exerted upon the respective discs through means of the thrust pins acting in oppositely inclined directions upon the respective oppositely disposed lugs on each of the two discs.

In order to admit the usual operating pressure fluid to the respective wheel cylinders, so as to actuate the opposed pistons in each cylinder, a supply line 36 leading from the usual master cylinder (not shown) or other source of hydraulic fluid supply, is connected to the back of one of the wheel cylinders 22, such as the upper cylinder as shown in Figure 2 of the drawings. The supply line 36 communicates with a bore or passage 37 extending through the back of the wheel cylinder and through the central partition 23 where it joins and establishes communication with an axially extended passage 38 through the partition, said latter passage opening at its opposite ends into the respective piston chambers 24 and 25 on opposite sides of the partition 23.

The wheel cylinder 22 to which the hydraulic fluid supply line 36 is connected, is also connected by a branch tube or pipe 39 to the oppositely disposed wheel cylinder, said branch pipe or tube 39 being preferably located at the rear of the backing plate 20 where it will always remain relatively cool and not subject to heat generated within the brake. The branch tube or pipe 39 thus interconnects both wheel cylinders 22, 22 of the same wheel, while only one of the wheel cylinders, such as the upper cylinder, is directly connected to the supply line 36. Since the wheel cylinders are preferably identical construction, the lower cylinder, in such instance, is provided with a screw plug 40 at the back thereof to plug the back end of the passage 37, which, in the case of the upper cylinder, is connected to the supply line 36.

It will be understood from the description given in the foregoing that when the hydraulic pressure fluid is forced into the respective wheel cylinders 22, 22 through the supply line 36 which leads into both cylinders at the center thereof, through the communicating passages 37 and 38, and the interconnecting branch pipe or tube 39, the pistons in both cylinders will be forced outwardly in opposite directions, thereby exerting thrusts through the thrust pins 35 to the respective discs 14, 15, in directions tending to slightly rotate the respective discs in opposite directions. This relative rotation of the discs 14, 15 causes the balls 17 to cam the discs apart, thereby axially separating the discs until they engage the rotatable brake housing or casing 8. If the housing 8 is rotating at the time of this initial engagement of the discs 14, 15 with the housing, the housing rotation tends to impart a rotation to the entire double-disc assembly. In prior brake constructions of this general type, it has been customary to provide stop lugs, studs or other rotation limiting means to prevent rotation of the double-disc assembly, except for a limited rotation necessary to permit a limited rotative movement of one disc relative to the other, according to the direction of rotation of the brake housing. The use of such stop lugs, studs, or other limiting means, as provided in the prior brake constructions, has presented the problem resulting from the production of objectionable noises which are quite pronounced and may be characterized as "clunking" or clicking sounds which are particularly objectionable in the case of brakes for automotive vehicles of the so-called pleasure type. While such noises may be readily eliminated, at least in part, on braking applications in one direction of rotation of the brake housing and wheel, no completely satisfactory way has been heretofore found to eliminate these noises incident to braking applications in the reverse direction of rotation of the brake housing and wheel. The present invention provided a complete and simple solution of this problem so that the noises are entirely eliminated on braking applications in either direction of rotation of the brake housing and wheel, and consequently in either direction of travel of the vehicle. This feature of the present invention may be characterized as a hydraulic stop means which prevents "clocking" of the double-disc brake assembly in either direction, irrespective of the direction of rotation of the brake housing, while always allowing limited rotation of one of the discs relative to the other disc, as well as axial separation of the discs.

The hydraulic stop means above referred to may be of several forms, two separate forms of which are illustrated in the accompanying drawings. Referring to the first form shown in Figures 1 to 5 inclusive, it will be seen that a double check valve having the form of a shuttle valve, generally indicated at 41, is mounted in the axially extended opening 38 in the partition 23 of each wheel cylinder 22.

Figure 4:
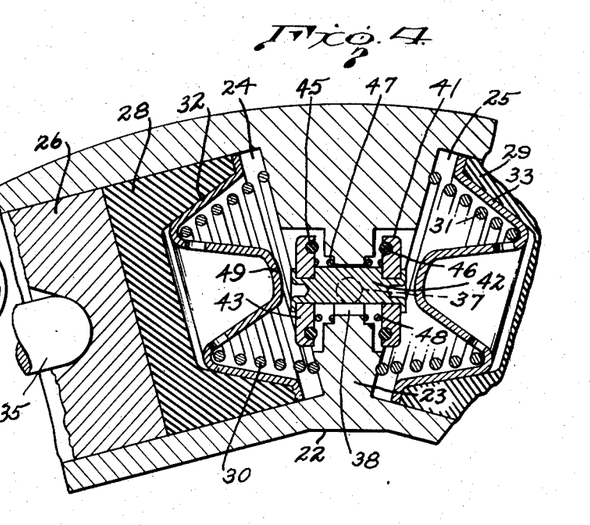
Figure 4 is a fragmentary vertical sectional view on a somewhat enlarged scale, as taken through the central part of one of the double-acting wheel cylinders, and more particularly illustrating the details of the double check valve or shuttle valve which is mounted in the central partition of the wheel cylinder.
Figure 5:
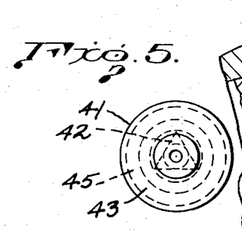
Figure 5 is a view in end elevation of the double check valve as seen on looking towards one end of the check valve shown in Figure 4.

The form of the shuttle valve 41 is best shown in Figures 4 and 5, from which it will be seen that the valve includes an intermediate rigid stem 42 which is triangular in transverse cross-section so as to be guided in the passage 38, while not completely obstructing this passage to the flow of the hydraulic fluid therethrough. A disc-shaped valve head is suitably connected to each end of the stem 42, said heads forming check valves respectively designated 43 and 44, the valve 43 being disposed in the piston chamber 24, and the valve 44 being disposed in the piston chamber 25. The valves 43 and 44 may be conveniently attached to the stem 42 by extending the stem centrally through the disc-like bodies, and then riveting over the protruding ends of the stem at the outside of the valve bodies.

Seated on the inner face of the respective valves 43 and 44 is a sealing ring or gasket which may be made of rubber or other suitable material, said sealing rings being respectively designated 45 and 46. The purpose of these sealing rings 45 and 46 is to produce a fluid-tight seal around each valve when the respective valves are seated against the partition 23, thereby effectively closing the corresponding end of the passage 38 when the valve is closed. The length of the valve stem 42 is such that only one of the valves 45 or 46 may be closed at one time, so that when one valve is closed, the other is open. Normally, the shuttle valve assumes a position with both of the valves 43 and 44 open, as shown in Figure 4, and if desired, a light coil spring is interposed between each valve and the adjacent face of the partition 23, the coil springs being respectively designated 47 and 48.

Now assuming that the brake is to be operated, and the vehicle wheel, together with the brake housing 8 is rotating in a counter-clockwise direction, as viewed in Figure 1, the pressure fluid which is admitted into the two wheel cylinders 22, 22 passes by the normally open check valves 43 and 44, into the respective piston chambers 24 and 25, thereby urging the expander, sealing cup and piston in both piston chambers in outward directions thereof, causing a thrust to be exerted on both of the discs 14, 15, in opposite directions, tending to rotate these discs relative to each other. This results in a camming action of the balls 17, spreading the discs apart and into engagement with the housing 8, which, as assumed, is rotating in a counter-clockwise direction, thus tending to "clock" the inner disc assembly in a corresponding counter-clockwise direction. This clocking tendency creates a torque upon the inner disc assembly which is transmitted through the plunger or thrust pin 35 at the right-hand end of the upper cylinder, and through the corresponding plunger or thrust pin at the left-hand end of the lower cylinder, to the pistons in the corresponding ends of these cylinders. The thrust against these pins 35 tends to push the pistons in the corresponding ends of these cylinders in an inward direction, and hence tends to displace the hydraulic fluid outwardly from the cylinder, but before the hydraulic fluid can be displaced, the check valve behind the respective pistons in the corresponding ends of the cylinders closes and traps the hydraulic fluid in the piston chambers, thereby effectively preventing "clocking" or rotation of the inner disc assembly. When the check valves close as above described, which would be the valve 44 in Figure 4, in the case of the upper wheel cylinder, and the valve 43 in Figure 3 in the case of the lower wheel cylinder, the opposite valves of the shuttle valve are automatically opened and held open, thereby permitting free passage of the hydraulic fluid into the opposite ends of the respective cylinders for actuation of the pistons and their associated thrust pins to rotate the disc 15 slightly relative to the disc 14 which is held relatively stationary by the hydraulic stop means, thereby further separating the inner discs to produce a stronger frictional engagement with the rotary brake housing 8, which is further aided by the servo-action of the brake in the usual manner of this type of brake construction.

On release of the brakes, the springs 19 act to move the inner discs 14, 15 towards each other and away from the rotary brake housing 8, thereby relieving the inner disc assembly from any torque and allowing the springs 30, 31 in the wheel cylinders to centralize or equalize the position of the inner discs, which remains so centralized until the brakes are again to be applied, either in the same direction of travel of the vehicle, or in the reverse direction of travel. When so relieved of the torque, the shuttle valve 41 opens in each cylinder and assumes a neutral position with both check valves 43 and 44 open, as shown in Figure 4, this neutral position of the shuttle valve being maintained normally by the balanced springs 47 and 48.

When the motion of the vehicle is reversed, with consequent reversal of the direction of rotation of the wheel and the brake housing 8, the anti-clocking feature above described also takes place and is the same, except that the hydraulic pressure fluid is trapped in the opposite ends of the respective wheel cylinders by closing of the opposite check valves of these cylinders, thereby holding the other inner disc relatively stationary, while allowing slight rotation of the first disc with respect to the relatively stationary disc, as well as axial separation of the discs, for effective braking action in the same manner as previously described. In either case, the braking action is equally effective and without any noise being produced in the brake. In both cases, the clocking torque is effectively opposed by the hydraulic pressure fluid within the wheel cylinders, this pressure fluid being automatically trapped in one end of each cylinder by suitable pressure responsive means such as a check valve which automatically closes to trap the fluid.

As an added safety feature, and in order to insure positive closing of the respective check valves 43 and 44 when the clocking torque is imposed upon either piston in each wheel cylinder, the central portion of each expander 32 and 33 is slightly elongated and cupped as at 49 so that the expander will engage the check valve and positively close the same before the adjacent piston and sealing cup can reach the extreme inner end of the piston chamber, thereby insuring positive opening of the opposite check valve in the opposite end of each wheel cylinder, with consequent release of the pressure fluid when the brakes are released. While this safety feature is not absolutely essential to the invention, it provides an added measure of safety to the brakes.

Figure 6:
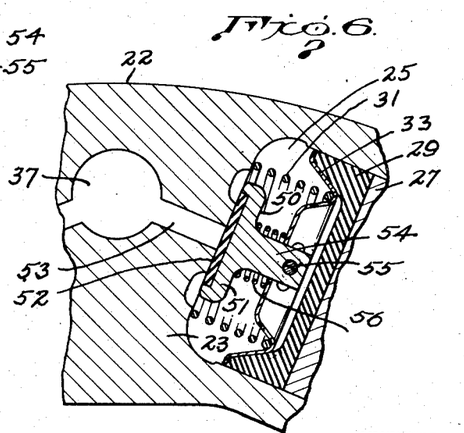
Figure 6 is an enlarged fragmentary vertical sectional view through one end of one of the double-acting wheel cylinders or power cylinders, and showing a modified form of check valve therein.
Figure 7:
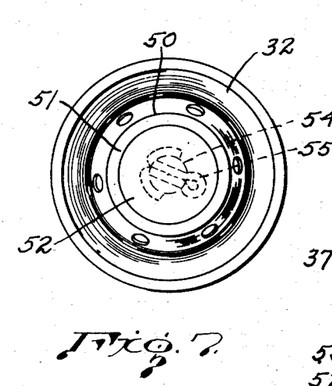
Figure 7 is an enlarged view in end elevation of the check valve assembly of Figure 6, as seen on looking towards the inner end of the check valve of Figure 6.

Referring to Figures 6 and 7 of the drawings, there has been shown in these figures a modified form of pressure responsive check valve which may be employed in lieu of the double-acting shuttle valve shown in Figures 1 to 5. According to the modified construction, each wheel cylinder 22 is the same as in Figures 1 to 5, and is provided with opposed pistons in the opposite ends of the same, together with the sealing cups located behind each piston. In the fragmentary sectional view shown in Figure 6, representing a portion of the righthand end of the upper wheel cylinder, the piston is designated 27 and the sealing cup is designated 29, as in the other figures. Also disposed behind each sealing cup is a sheet metal, flexible expander, as indicated at 33 in Figure 6, said expander being yieldingly pressed against the sealing cup by coil spring 31.

Carried by the expander is a check valve 50 having the form of a disc-like body 51 in the inner face of which is seated a rubber or other flexible sealing disc 52 which is adapted to seat against the transversely extended partition 23 of the wheel cylinder to close the fluid passage 53 leading into the piston chamber from the fluid intake passage 37 which is in communication with a fluid pressure line leading from a source of fluid pressure and connected to the back of the wheel cylinder.

The check valve body 51 is provided with an axially extended stem 54 which loosely extends centrally through the central part of the expander 33, as clearly shown in Figure 6, and a cotter pin 55 is extended through the stem to prevent the check valve from becoming accidentally displaced from the opening in the expander 33. A light coil spring 56 yieldingly urges the valve body 51 away from the expander 33, with the coil spring 56 interposed between the check valve body 51 and the adjacent central portion of the expander 33.

This check valve construction as just described is duplicated in each piston chamber of each wheel cylinder, and the check valves function in the same manner and for the same purpose as the interconnected check valves 43 and 44 in Figures 1 to 5 inclusive. In other words, when the brake is applied during rotation of the brake housing in either direction, by forcing the pressure fluid into the wheel cylinders, the torque imparted by the rotating brake housing to the inner disc assembly exerts an inward thrust against the thrust pins at one end of one wheel cylinder and at the opposite end of the other wheel cylinder, respectively, thereby forcing the pistons associated with these respective thrust pins inwardly or rearwardly in their piston chambers until the associated check valves seat against the partitions 23 of the respective cylinders and close the adjacent fluid passages leading into these particular piston chambers, thereby trapping the pressure fluid behind these particular pistons and preventing clocking of the inner disc assembly. As this trapping action occurs, the check valves associated with the opposed pistons of the respective cylinders are held open by the action of the pressure fluid which is admitted freely into these latter piston chambers, thereby permitting the pressure fluid to act against these pistons and exert a thrust through their associated thrust pins against the opposed inner disc so as to cause slight rotation of the latter disc relative to the other disc, this relative rotation of the discs serving to energize the brake.

If rotation of the brake housing occurs in the opposite direction, the same action takes place, except that the opposite check valves in the respective wheel cylinders automatically close and trap the pressure fluid behind the opposite pistons in the respective cylinders, thus preventing clocking of the inner disc assembly in the other direction, while permitting normal energization of the brake in the usual manner. As in the first form of the invention, the modified construction is completely silent in operation, and free of noise such as formerly attended the use of mechanical stops heretofore employed to limit clocking movements of the inner disc assembly in either direction.

While the specific details have been herein shown and described, the invention is not confined thereto as changes and alterations may

I claim:

1. A fluid-operated brake, comprising a braking element movably mounted for frictional engagement with a rotary member to be braked, a fluid pressure actuator operatively connected with said braking element for imparting braking and releasing movements thereto, said actuator having means comprising a check valve disposed with the actuator in the path of the pressure fluid for imposing the torque imparted to the braking element upon frictional engagement of the latter with the rotary member to be braked, upon the pressure fluid within said actuator, incident to braking engagement of the braking element with the rotary member to be braked tending to rotate the braking element with the member to be braked in either direction of rotation of the member aforesaid, whereby to prevent rotation of the braking element with the rotary member to be braked, said check valve being automatically operative to admit the pressure fluid for brake application movements of the braking element aforesaid, while preventing return of the pressure fluid responsive to torque imposed upon said braking element.

2. A fluid-operated disc brake, comprising a rotary member to be braked, a braking unit composed of a pair of discs, each having a friction surface on the outer face thereof for frictional engagement with corresponding opposed friction surfaces on the rotary member to be braked, said discs being free to move rotatively and axially relative to each other, camming means disposed between said discs for axially separating the same into frictional engagement with the rotary member to be braked, responsive to rotation of one disc relative to the other, a stationary fluid pressure brake actuator comprising a cylinder having opposed pistons therein operative upon the respective discs for rotating one disc slightly relative to the other, and pressure fluid responsive means in said fluid pressure brake actuator for trapping the pressure fluid behind either piston to prevent rotative movement of one disc by the torque imposed thereon incident to engagement thereof with the rotary member to be braked, while leaving the other disc free to rotate relative to the first disc responsive to the pressure fluid acting upon the piston for the other disc aforesaid.

3. A brake as defined in claim 2, wherein the pressure fluid responsive means comprises check valve means in the path of the pressure fluid flow to each piston in the cylinder.

4. A brake as defined in claim 2, wherein the actuator cylinder is provided with a transverse partition between its opposite ends, said partition dividing the cylinder into separate piston chambers in which the opposed pistons are respectively disposed, said partition having an axially extended opening therethrough interconnecting the piston chambers and having a pressure fluid passage leading from the exterior of said cylinder to said interconnecting opening, and wherein said pressure fluid responsive means comprises a valve member in each piston chamber coacting with the opposite ends, respectively, of the interconnecting opening through said partition.

5. A brake as defined in claim 2, wherein the actuator cylinder is provided with a transverse partition between its opposite ends, said partition dividing the cylinder into separate piston chambers in which the opposed pistons are respectively disposed, said partition having an axially extended opening therethrough interconnecting the piston chambers and having a pressure fluid passage leading from the exterior of said cylinder to said interconnecting opening, and wherein said pressure fluid responsive means comprises a valve member in each piston chamber coacting with the opposite ends, respectively, of the interconnecting opening through said partition, said valve members being connected together by a common stem extended through said partition opening.

6. A brake as defined in claim 2, wherein the actuator cylinder is provided with a transverse partition between its opposite ends, said partition dividing the cylinder into separate piston chambers in which the opposed pistons are respectively disposed, said partition having an axially extended opening therethrough interconnecting the piston chambers and having a pressure fluid passage leading from the exterior of said cylinder to said interconnecting opening, and wherein said pressure fluid responsive means comprises a valve member in each piston chamber coacting with the opposite ends, respectively, of the interconnecting opening through said partition, said valve members being connected together by a common stem extended through said partition opening, said common stem being guided in said opening to open and close the respective valve members, but allowing the pressure fluid to flow along the stem in the opening to the respective piston chambers.

7. A brake as defined in claim 2, wherein the actuator cylinder is provided with a transverse partition between its opposite ends, said partition dividing the cylinder into separate piston chambers in which the opposed pistons are respectively disposed, said partition having an axially extended opening therethrough interconnecting the piston chambers and having a pressure fluid passage leading from the exterior of said cylinder to said interconnecting opening, and wherein said pressure fluid responsive means comprises a valve member in each piston chamber coacting with the opposite ends, respectively, of the interconnecting opening through said partition, said valve members being connected together by a common stem extended through said partition opening, said common stem being of such length that when one valve member is closed over the corresponding end of the interconnecting opening through the partition, the other valve member is opened and spaced from the opposite end of the opening.

8. A brake as defined in claim 2, wherein the actuator cylinder is provided with a transverse partition between its opposite ends, said partition dividing the cylinder into separate piston chambers in which the opposed pistons are respectively disposed, said partition having an axially extended opening therethrough interconnecting the piston chambers and having a pressure fluid passage leading from the exterior of said cylinder to said interconnecting opening, and wherein said pressure fluid responsive means comprises a valve member in each piston chamber coacting with the opposite ends, respectively, of the interconnecting opening through said partition, said valve members being connected together by a common stem extending through said partition opening, said common stem being of such length that when one valve member is closed over the corresponding end of the interconnecting opening through the partition, the other valve member is opened and spaced from the opposite end of the opening, and means for normally urging both valve members to their open position.

9. A brake as defined in claim 2, wherein the actuator cylinder is provided with a transverse partition between its opposite ends, said partition dividing the cylinder into separate piston chambers in which the opposed pistons are respectively disposed, said partition having an axially extended opening therethrough interconnecting the piston chambers and having a pressure fluid passage leading from the exterior of said cylinder to said interconnecting opening, and wherein said pressure fluid responsive means comprises a valve member in each piston chamber coacting with the opposite ends, respectively, of the interconnecting opening through said partition, said valve members being connected together by a common stem extended through said partition opening, said common stem being of such length that when one valve member is closed over the corresponding end of the interconnecting opening through the partition, the other valve member is opened and spaced from the opposite end of the opening, and yieldable means for normally urging both valve members to their open position.

10. A fluid-operated disc brake, comprising a rotary member to be braked, a braking unit composed of a pair of discs, each having a friction surface on the outer face thereof for frictional engagement with corresponding opposed friction surfaces on the rotary member to be braked, said discs being free to move rotatively and axially relative to each other, camming means disposed between said discs for axially separating the same into frictional engagement with the rotary member to be braked, responsive to rotation of one disc relative to the other, yieldable means interconnecting said discs and normally urging said discs towards each other with the camming means held therebetween, a stationary fluid pressure brake actuator comprising a cylinder having opposed pistons therein operative upon the respective discs for rotating one disc slightly relative to the other, the axis of the respective pistons and their movement in the cylinder being inclined with respect to each other and inwardly towards the central axis of the disc unit, and a thrust pin interposed between the outer end of one piston and a thrust-receiving lug formed on one of said discs, and a thrust pin interposed between the outer end of the other piston and a corresponding thrust-receiving lug formed on the other disc, the opposite ends of each of said pins being rounded and seating in correspondingly rounded seats in the respective pistons and disc lugs.

11. A fluid-operated disc brake, comprising a rotary member to be braked, a braking unit composed of a pair of discs, each having a friction surface on the outer face thereof for frictional engagement with corresponding opposed friction surfaces on the rotary member to be braked, said discs being free to move rotatively and axially relative to each other, camming means disposed between said discs for axially separating the same into frictional engagement with the rotary member to be braked, responsive to rotation of one disc relative to the other, yieldable means interconnecting said discs and normally urging said discs towards each other with the camming means held therebetween, a stationary fluid pressure brake actuator comprising a cylinder having opposed pistons therein operative upon the respective discs for rotating one disc slightly relative to the other, the axis of the respective pistons and their movement in the cylinder being inclined with respect to each other and inwardly towards the central axis of the disc unit, and a thrust pin interposed between the outer end of one piston and a thrust-receiving lug formed on one of said discs, and a thrust pin interposed between the outer end of the other piston and a corresponding thrust-receiving lug formed on the other disc, the opposite ends of each of said pins being rounded and seating in correspondingly rounded seats in the respective pistons and disc lugs, a second stationary fluid pressure brake actuator identical with the first-mentioned actuator and located diametrically opposite thereto with its opposed inclined pistons correspondingly operative upon the respective discs at points diametrically opposite to the first actuator, with said discs freely floating upon the thrust pins and automatically and constantly centered coaxially with the rotary member to be braked for rotative and axial movements of said discs during braking applications.

12. A fluid-operated brake actuator, comprising a cylinder having a transversely extended partition dividing the same into opposed piston chambers, said partition having an axially extended opening therethrough establishing communication between the respective piston chambers and having an inlet passage leading from the exterior of said cylinder to the axially extended opening aforesaid, a brake actuating piston in each piston chamber, and pressure fluid responsive means for trapping pressure fluid in either piston chamber behind the piston incident to the application of inward thrust on said piston, while leaving the other piston free to move in either direction in its chamber responsive to the pressure fluid admitted and released through the cylinder inlet.

13. A fluid-operated brake actuator, comprising a cylinder having a transversely extended partition dividing the same into opposed piston chambers, said partition having an axially extended opening therethrough establishing communication between the respective piston chambers and having an inlet passage leading from the exterior of said cylinder to said axially extended opening aforesaid, a brake actuating piston in each piston chamber, and pressure fluid responsive means for trapping pressure fluid in either piston chamber behind the piston incident to the application of inward thrust on said piston, while leaving the other piston free to move in either direction in its chamber responsive to the pressure fluid admitted and released through the cylinder inlet, said pressure fluid responsive means comprising a valve member in each piston chamber coacting respectively with the opposite ends of the axially extended opening through the cylinder partition.

14. A fluid-operated brake actuator, comprising a cylinder having a transversely extended partition dividing the same into opposed piston chambers, said partition having an axially extended opening therethrough establishing communication between the respective piston chambers and having an inlet passage leading from the exterior of said cylinder to said axially extended opening aforesaid, a brake actuating piston in each piston chamber, and pressure fluid responsive means for trapping pressure fluid in either piston chamber behind the piston incident to the application of inward thrust on said piston, while leaving the other piston free to move in either direction in its chamber responsive to the pressure fluid admitted and released through the cylinder inlet, said pressure fluid responsive means comprising a valve member in each piston chamber coacting respectively with the opposite ends of the axially extended opening through the cylinder partition, said valve members being connected together by a common stem extended through said latter partition opening.

15. A fluid-operated brake actuator, comprising a cylinder having a transversely extended partition dividing the same into opposed piston chambers, said partition having an axially extended opening therethrough establishing communication between the respective piston chambers and having an inlet passage leading from the exterior of said cylinder to said axially extended opening aforesaid, a brake actuating piston in each piston chamber, and pressure fluid responsive means for trapping pressure fluid in either piston chamber behind the piston incident to the application of inward thrust on said piston, while leaving the other piston free to move in either direction in its chamber responsive to the pressure fluid admitted and released through the cylinder inlet, said pressure fluid responsive means comprising a valve member in each piston chamber coacting respectively with the opposite ends of the axially extended opening through the cylinder partition, said valve members being connected together by a common stem extended through said latter partition opening, and the stem being of such length that when one valve member is closed over the corresponding end of said latter partition opening, the other valve member is open and spaced from the opposite end of the opening.

16. A fluid-operated brake actuator, comprising a cylinder having a transversely extended partition dividing the same into opposed piston chambers, said partition having an axially extended opening therethrough establishing communication between the respective piston chambers and having an inlet passage leading from the exterior of said cylinder to said axially extended opening aforesaid, a brake actuating piston in each piston chamber, and pressure fluid responsive means for trapping pressure fluid in either piston chamber behind the piston incident to the application of inward thrust on said piston, while leaving the other piston free to move in either direction in its chamber responsive to the pressure fluid admitted and released through the cylinder inlet, said pressure fluid responsive means comprising a valve member in each piston chamber coacting respectively with the opposite ends of the axially extended opening through the cylinder partition, said valve members in the respective piston chambers being interposed between the pistons and the adjacent ends of the partition opening and being operable by the respective pistons for conjoint movement therewith.

17. A brake as defined in claim 2, wherein the pressure fluid responsive means comprises a check valve in the path of the pressure fluid flow to each piston in the cylinder, with each check valve actuated by its piston and conjointly movable therewith.

18. A brake as defined in claim 2, wherein the actuator cylinder is provided with a transverse partition between its opposite ends, said partition dividing the cylinder into separate piston chambers in which the opposed pistons are respectively disposed, said partition having an axially extended opening therethrough interconnecting the piston chambers and having a pressure fluid passage leading from the exterior of said cylinder to said interconnecting opening, and wherein said pressure fluid responsive means comprises a valve member in each piston chamber coacting with the opposite ends, respectively, of the interconnecting opening through said partition, said valve members being connected together by a common stem extended through said partition opening, said common stem being of such length that when one valve member is closed over the corresponding end of the interconnecting opening through the partition, the other valve member is opened and spaced from the opposite end of the opening, and safety means operable by the respective pistons for positively closing one valve member and simultaneously opening the other valve member.

OSBORN A. KERSHNER.

REFERENCES CITED

The following references are of record in the file of this patent:

UNITED STATES PATENTS

| Number | Name | Date |
| --- | --- | --- |
| 2,214,679 | Scott | Sept. 10, 1940 |
| 2,344,690 | Freer | Mar. 21, 1944 |